United States Patent
Moon et al.

(10) Patent No.: US 9,946,479 B2
(45) Date of Patent: *Apr. 17, 2018

(54) DIRECT HINTING FOR A MEMORY DEVICE

(71) Applicant: Seagate Technology LLC, Cupertino, CA (US)

(72) Inventors: John Edward Moon, Superior, CO (US); Robert Dale Murphy, Longmont, CO (US); Michael Habinsky, Broomfield, CO (US); David A. Hitch, Longmont, CO (US); Thomas Dale Hosman, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/256,714

(22) Filed: Sep. 5, 2016

(65) Prior Publication Data

US 2017/0060456 A1 Mar. 2, 2017

Related U.S. Application Data

(63) Continuation of application No. 14/136,483, filed on Dec. 20, 2013, now Pat. No. 9,436,408.

(51) Int. Cl.
*G06F 3/06* (2006.01)
*G06F 12/0873* (2016.01)
*G06F 12/0846* (2016.01)

(52) U.S. Cl.
CPC .......... *G06F 3/0619* (2013.01); *G06F 3/061* (2013.01); *G06F 3/0604* (2013.01); *G06F 3/064* (2013.01); *G06F 3/065* (2013.01); *G06F 3/0629* (2013.01); *G06F 3/0659* (2013.01); *G06F 3/0676* (2013.01); *G06F 3/0679* (2013.01); *G06F 3/0683* (2013.01); *G06F 12/0848* (2013.01); *G06F 12/0873* (2013.01); *G06F 2206/1014* (2013.01); *G06F 2212/282* (2013.01)

(58) Field of Classification Search
CPC .... G06F 3/0685; G06F 3/0604; G06F 3/0647; G06F 12/0873
See application file for complete search history.

(56) References Cited

U.S. PATENT DOCUMENTS

| 7,916,528 | B2 | 3/2011 | Chen et al. | |
| 9,436,408 | B2 * | 9/2016 | Moon | G06F 3/065 |
| 2009/0198932 | A1 | 8/2009 | Rozinak | |

(Continued)

*Primary Examiner* — Edward J Dudek, Jr.
(74) *Attorney, Agent, or Firm* — Cesari & Reed, LLP; Kirk A. Cesari; Christian W. Best (57) ABSTRACT

A data storage area of a data storage device can be used to communicate information between the data storage device and an external device or software. In some examples, configuration data stored within the data storage area can be used to determine a subset of data to copy or move from a first data storage medium to a second data storage medium. The data storage area can be a unique partition and the data storage device can locate partition information to determine a location of the partition. The data storage device can then use the partition to store data for two-way communication between the data storage device and an external system, device, or software.

16 Claims, 5 Drawing Sheets

(56) References Cited

U.S. PATENT DOCUMENTS

2009/0241103 A1\* 9/2009 Pennisi ..................... G06F 8/65
 717/173
2009/0300269 A1\* 12/2009 Radke ................. G06F 12/0246
 711/103

\* cited by examiner

DIRECT HINTING FOR A MEMORY DEVICE

SUMMARY

In some embodiments, an apparatus can comprise a first memory, a second memory, and a controller coupled to the first memory and the second memory. The controller can be configured to receive first data to be stored at a first data storage location of the first memory, the first data including an indicator of other data to be transferred from the first memory to the second memory, and store the other data in the second memory based on the first data.

In some embodiments, an apparatus can comprise a data storage device including a first data storage medium, a second data storage medium, and a controller coupled to the first data storage medium and the second data storage medium. The controller can be adapted to store first data received from a host at a first data storage location of the first data storage medium, the first data including information from the host to configure the data storage device, and configure the data storage device based on the information.

In some embodiments, an apparatus can comprise a data storage device configured to read configuration data stored within the data storage device and transfer user data from a first data storage medium to a second data storage medium based on the configuration data.

DETAILED DESCRIPTION

In the following detailed description, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure. For example, the following detailed description will mainly refer to disc drives and flash memory; however, the embodiments described herein can be applied to any type of data storage device or memory, or any combination of different types of memory. In some examples, a first memory and a second memory that have one or more different memory characteristics may be used, such as where the second memory type has a faster data access capability than the first memory type. In some embodiments, the different memory characteristic can be different structural types of memory, such as a single level cell nonvolatile solid state memory and a multi-level cell nonvolatile solid state memory, or such as nonvolatile solid state memory and a magnetic disc memory. In various configurations, the memories may be nonvolatile solid state memory, volatile solid state memory, magnetic disc memory, another type of memory, or any combination thereof.

Figure 1:
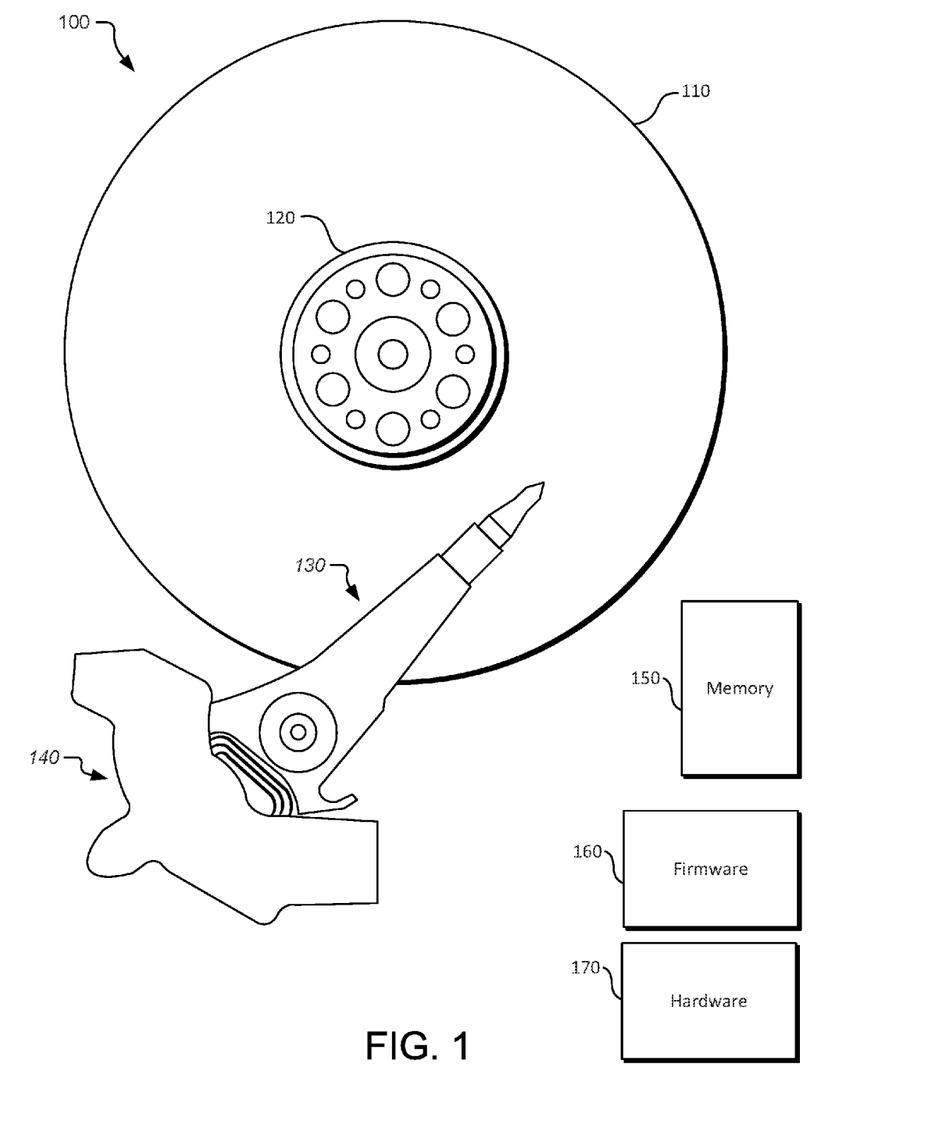
FIG. 1 illustrates a memory device having a direct hint partition.

An example of a memory (or data storage device) is illustrated in FIG. 1 as a disc drive 100. Disc drive 100 includes a magnetic medium 110 that is rotated by a spindle motor (not shown) through a coupling by clamp 120. Actuator assembly 130 is moved by motor 140 to position a transducer (not shown) relative to the surface of magnetic medium 110. Disc drive 100 further includes memory 150 that can be DRAM or nonvolatile memory (such as flash memory), or both. Firmware 160 controls hardware 170 to perform functions of disc drive 100. Some of those functions will described in further detail below. A storage controller can include firmware 160 and hardware 170. Firmware 160 can reside in memory 150, magnetic medium 110, hardware 170 or other memory not shown.

One opportunity with data storage devices is to decrease the time to access the stored data. To illustrate, a desktop computer can use a microprocessor that resides with DRAM on the same motherboard. A data storage device such as a disc drive is connected to the motherboard via a storage interface standard connector and interface communication protocol. In this architecture, the time to access data, information and programs in the DRAM is a few orders of magnitude less than the time to access the disc drive.

One way to decrease access time in a data storage device is via caching. In a disc drive, caching can be accomplished with a cache memory, such as DRAM, that can have a faster access time than that of the magnetic media of the disc drive. For example, memory 150 in FIG. 1 can be used as a cache memory. One caching method can cache frequently accessed data. Other methods can use temporal or spatial relationships to cache data. Although these caching methods can decrease access time, even faster access times are desirable.

In some examples, a Solid State Hybrid Drive (SSHD) can improve the performance of a disc drive by caching data into a nonvolatile solid state memory, such as flash memory, that reduces latency when retrieving the cached data. Thus, memory 150 in FIG. 1 can be a nonvolatile solid state memory, such as flash memory. Since there may be a smaller capacity of the nonvolatile solid state memory than a magnetic media capacity, a determination can be made as to which data is beneficial to store in the nonvolatile memory. The SSHD can possess information (e.g., access frequency, spatial and temporal relationships, sequential access, latency, etc.) that is beneficial to help make these determinations as does the host operating system (e.g., access frequency, temporal relationships, etc.). A memory may be selected to store cache data because it is faster, more reliable, uses less power than another memory, or for other reasons. In some instances, a portion of a memory may be used for a cache, such as a portion of a magnetic disc or a portion of a nonvolatile solid state memory.

A "self-pinning" SSHD can use the internal firmware of the SSHD to make decisions on which data to cache. This can provide significant improvements over designs that have the host system control the data caching. The improvements come from several aspects, such as the drive is more aware of what accesses cause long latencies, the drive firmware can ensure that there is cohesive data in the nonvolatile memory and on the magnetic media, and the decision making and movement of data can be accomplished without utilizing any of the host system resources.

As stated above, information may be possessed by the host system (e.g. the operating system) or a software application that can be valuable in determining which data to cache in a data storage device. With this information the data storage device can provide even greater performance gains. A mechanism can be used for the host system to "hint" to the data storage device what data (e.g. which LBAs) should be cached, sending suggestions with via read and write commands to the drive. The implementation for this mechanism can be problematic and may involve significant interaction in the development to make sure that host algorithms and SSHD algorithms work well together. The mechanism implementation also creates significant work on the host system software development. This can be considered an indirect method of passing information to the data storage device.

In some examples, information can be passed from a software application or host (collectively an example of a "system") operating system (OS) to a data storage device via use of a set of LBAs on the data storage device as a set of registers for communication between the software application, or host OS, and the data storage device. In certain embodiments, a unique partition can be created on the data storage device for exclusive use by an application software or host OS. This can preserve a designated set of LBAs that can prevent any other OS or software application function from corrupting the data in the unique partition. It can also ensure the set of LBAs assigned to the unique partition will not change.

Partitions and partition types may be determined from a master boot record (MBR) or a globally unique identifier (GUID) partition table (GPT). A MBR partition table can be read by a host system BIOS at power up to determine partition types and locations. The GPT uses the Unified Extensible Firmware Interface ("UEFI") bios standard. A GPT with UEFI bios can be adaptable to vendor customization and may allow for an easier implementation. Using a GPT, a particular partition type ("direct hint partition") can be created that the software application or host OS communicates with without having to use a driver to implement custom or specialized commands. In some embodiments, the direct hint partition is separate from any partition used for host or data storage device system information.

Figure 2A:
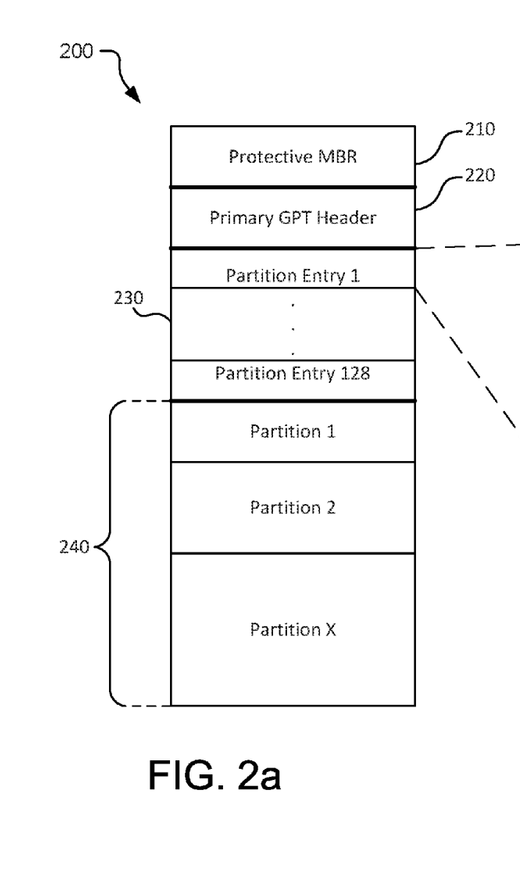
FIGS. 2a and 2b illustrate a partitioning structure having a direct hint partition.

To use the GPT, the partitioning structure stored in the data storage device will be first explained with reference to FIG. 2a. GPT partitioning structure 200 includes a protective MBR 210 that is used for legacy systems. Primary GPT Header 220 defines the LBA address ranges that are available for the partitions, and includes other system information. Partition entries 230 include an entry for each partition. The remainder of GPT partitioning structure 200 describes the partitions 240.

Partition entries 230 will be described with reference to FIG. 2b. Shown is a partition entry 230' that includes a partition type GUID entry that identifies the type of data that the partition contains and how the partition is used. A unique partition GUID is assigned to the direct hint partition as a unique identifier. Start and End LBA entries define the LBA range of the partition. An attributes entry describes how the partition is used. A partition name entry can be used to name the partition. A user, the software application or other utility can create the partition. The "diskpart" function in Windows can be used to create a partition in the data storage device. The command "create partition primary" with the argument "ID=XX" will save the value XX in the field for unique partition GUID of the partition entry. The direct hint partition, for instance, can be created on magnetic medium 110 in FIG. 1.

After the direct hint partition is created, a software application or host OS can use it to communicate with the data storage device without any modifications to the OS file system or the storage interface standard used between the host and the data storage device. That is, the host OS file system and interface systems can be unaware of the use of the direct hint partition. To illustrate, a software application operating on a Windows OS can selectively place a certain file it designates into the flash memory (e.g., memory 150 in FIG. 1) of the SSHD. To do this, the software application can call a Windows Kernel API function called DeviceIOControl with the FSCTL_GET_RETRIEVAL_POINTERS control code to get the LBAs for the file. Once those corresponding LBAs are retrieved, the software application can store a list of those LBAs into another file that is then saved on the direct hint partition.

Figure 3:
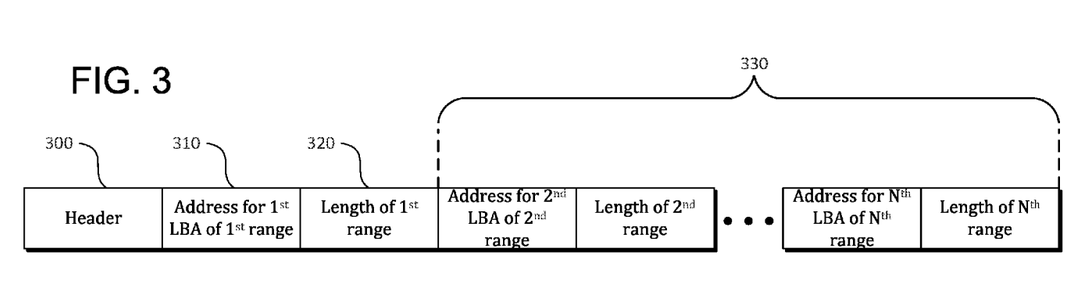
FIG. 3 illustrates a data structure of a direct hint partition.

A predefined data structure within a direct hint partition is shown in FIG. 3, which can be populated from information in the saved file. The information can include a header 300 and LBA information that are to be moved or copied to a selected memory of the SSHD, such as a flash memory. Header 300 can include an indicator that the following LBAs are to be stored in the selected memory. Header 300 can also be used as a check to ensure the file information has not been corrupted. Entry 310 identifies the first LBA to be saved in the flash memory. Entry 320 identifies the LBA length from the first LBA to be saved. Entries 310 and 320 can be LBAs that correspond to a portion of a file, an entire file, multiples files or any combination thereof. Additional LBAs can be identified as shown by entries 330. Each entry can be a predefined size, and the same size, such as 5 bytes.

A method for the data storage device to read the saved file will be explained with reference to FIGS. 2a, 2b and 3. The firmware of the data storage device knows that LBA 0 of the magnetic media is reserved for the protective MBR 210 of the partitioning structure 200 of FIG. 2a. The firmware also knows LBA 1 is reserved for the primary GPT header 220. The firmware further knows that LBAs 2-33 contain up to 128 partition entries 230. Each partition entry is 128 bytes, with four entries in each LBA. Each of the first of the four entries starts on the LBA boundary.

Figure 2B:
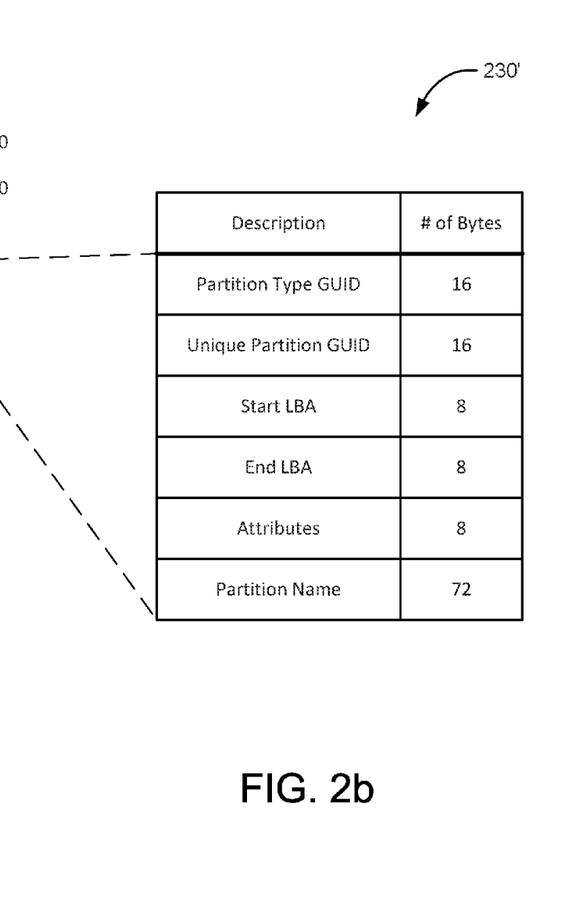

The firmware also knows the structure of each entry as shown by partition entry 230' in FIG. 2b. The firmware starts searching through LBAs 2-33 looking for the unique partition GUID (XX as described above) that identifies the direct hint partition. Once found, the firmware reads the bytes of partition entry 230' to determine the start and end LBAs of the direct hint partition. Once the firmware knows the start and end LBAs of the direct hint partition, it can read the information saved to it. In other words, the firmware reads the data structure shown in FIG. 3 to determine which LBAs the software application wants stored in the flash memory of the SSHD. This will allow quick access to write and read this data. The start and end LBAs can be saved by the firmware for future use.

Figure 4:
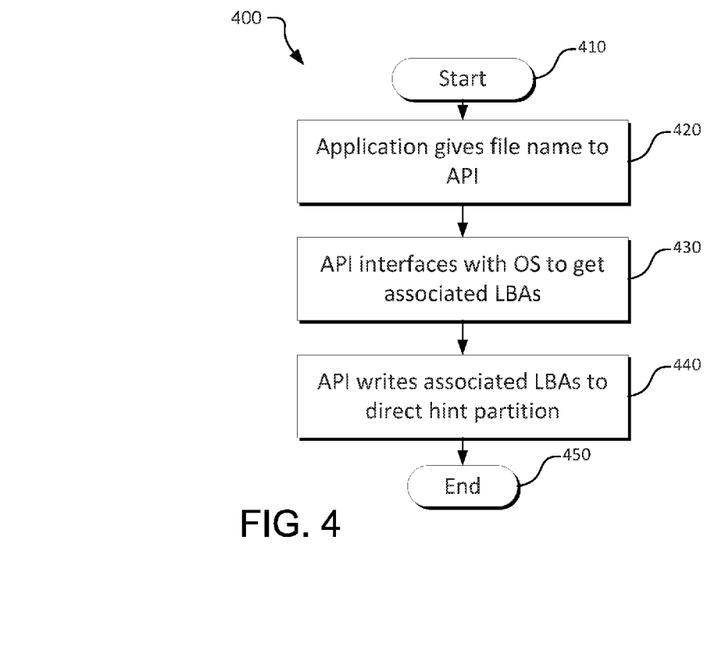
FIG. 4 illustrates a method of saving information to a direct hint partition.

FIG. 4 shows a process 400. Step 410 starts process 400. At step 420 the software application provides a file name, which the software application determines should be cached at the data storage device, to an application program interface (API). Process 400 then proceeds to step 430 where the API queries the OS to obtain the LBAs associated with the file name. At step 440, the API can write the associated list of LBAs to the direct hint partition. The API can access the direct hint partition to write the associated list of LBAs. Alternatively, the LBAs can be passed back to the software application, which then stores the lists of LBAs in another file, and then saves the other file (i.e. the list of LBAs) to the direct hint partition. Process 400 ends at step 450. The API can be a separate application from the software application. Alternatively, the API can be incorporated into the source code of the software application, a module or function called by the software application, or can be a file associated with the software application executable such as a dynamic link library (dll).

Figure 5:
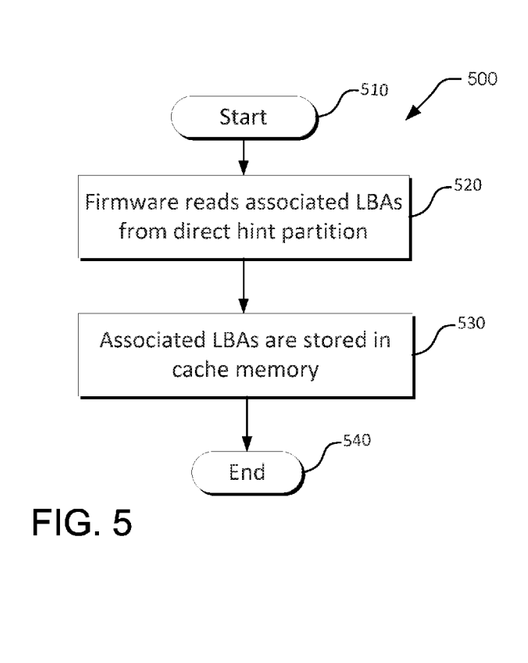
FIG. 5 illustrates a method of configuring a memory device based on information saved to a direct hint partition.

The data storage device can use the associated LBAs as shown in process 500 of FIG. 5. After starting at step 510, the firmware of the data storage device (e.g., firmware 160 in FIG. 1) can read the direct hint partition, including any lists/files, to determine indicated LBAs, at step 520. At step 530, files and data associated with the indicated LBAs can be stored in cache memory (e.g., memory 150 in FIG. 1). Step 540 ends process 500.

The above-described methods and apparatuses can be implemented independent of any storage interface standard (e.g., SCSI, SATA, USB), any hardware and any software, driver, an OS file system, etc. That is, the interface control systems and the OS file system may be unaware that a software program can pass information to a data storage device indicating selected file(s) to be stored in a cache. No specific modifications to the OS or standardized interface are needed to implement this system.

Figure 6:
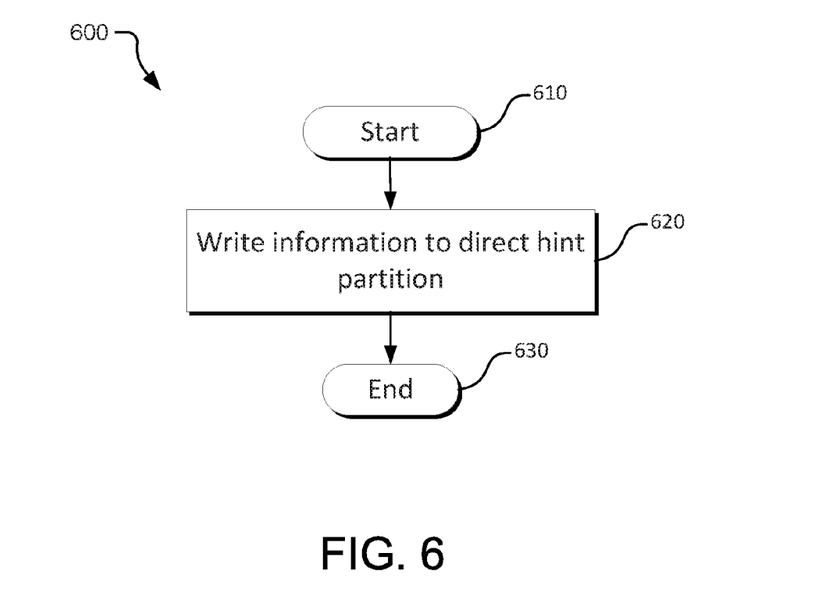
FIG. 6 illustrates a method of saving information to a direct hint partition.
Figure 7:
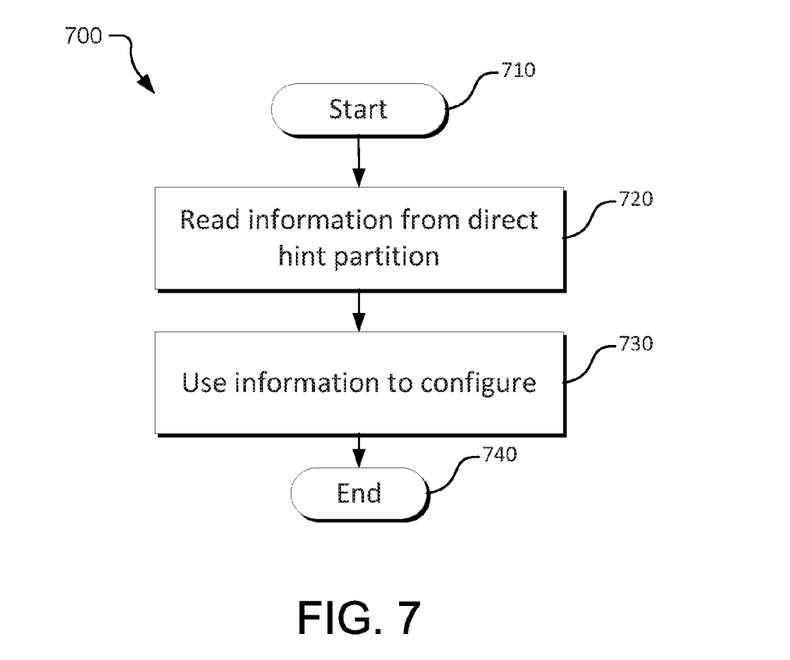
FIG. 7 illustrates another method of configuring a memory device based on information saved to a direct hint partition.

The above-described methods and apparatus can also be used to pass other information to the data storage device besides LBA information. This is shown by processes 600 and 700 of FIGS. 6 and 7. Process 600 starts at step 610, then proceeds to step 610 where the host OS or software application writes information to the direct hint partition address. Process 600 ends at step 630. Process 700 shows steps used by the data storage device to process the information in the direct hint partition. Step 710 starts the process, then at step 720 the firmware of the data storage device reads the information from the direct hint partition. From there, the firmware uses the information read from the direct hint partition, for example, to configure the data storage device such as by optimizing parameters, algorithms or functions of the data storage device, or setting priorities in the data storage device.

Figure 8:
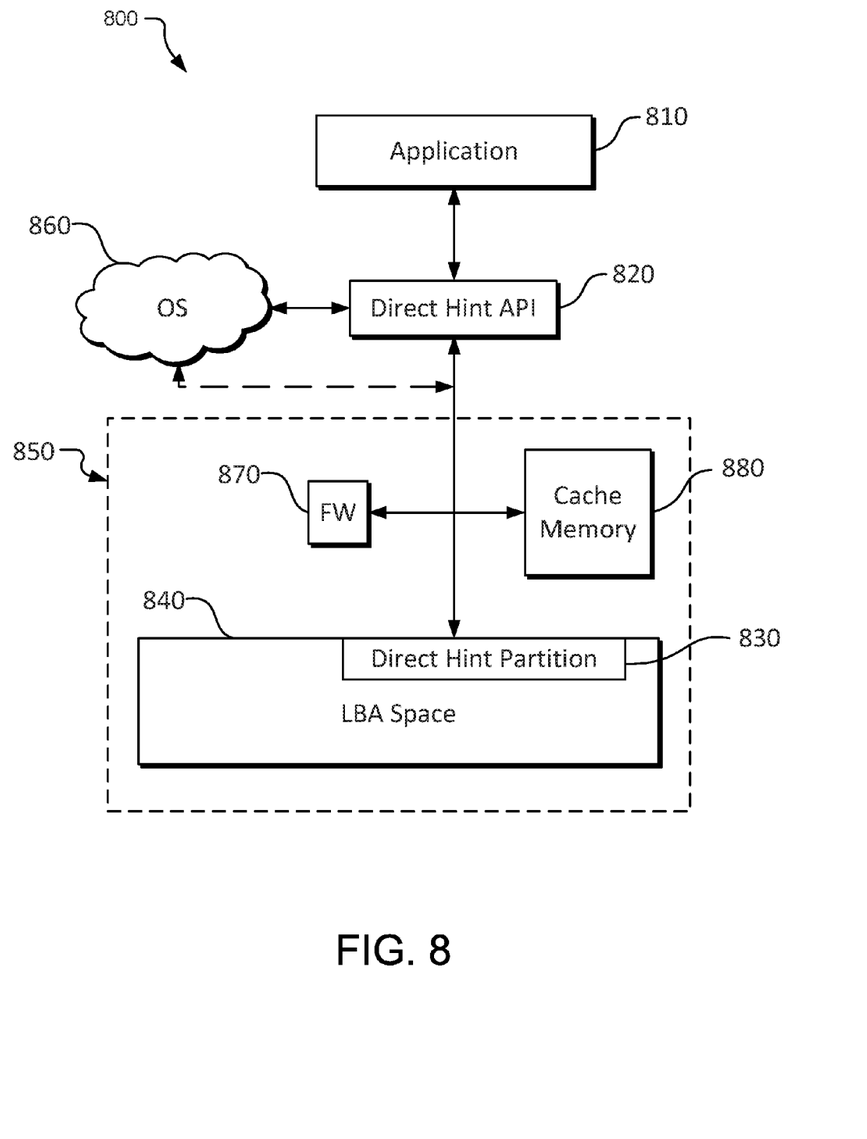
FIG. 8 illustrates a system adapted to implement a direct hint partition.

FIG. 8 shows a system 800 that can use methods and apparatus described above. A software application 810 communicates to direct hint API 820 a file name or information it wants saved to the direct hint partition 830 in LBA space 840 of data storage device 850. Direct hint API 820 interfaces with system OS 860 to obtain the associated LBAs or other necessary information to save the file or information provided by software application 810. Direct hint API 820 writes the associated LBAs or other necessary information to data storage device 850. Firmware 870 reads direct hint partition 830. In the case where the software application 810 wants a file saved in cache memory 880, firmware 870 reads the associated LBAs from a data storage medium of the data storage device and saves the data located at the LBAs into cache memory 880. If information other than a file (e.g., configuration information) is sent to direct hint partition 830, firmware 870 responds accordingly. Also, OS 860 can write directly to direct hint partition 830 as indicated by the dashed line.

In particular, the methods and apparatus described above can provide host or system information such as background and foreground activity, host or system power source and battery level and other environmental information, and host or system configuration such as OS and drivers, host or system resource utilization, etc. One particular information is the host or system identifies to the data storage device the type of contents being written to the LBAs. For example, the host or system can inform the data storage device that data saved at certain LBAs is metadata or audio/visual data. The data storage device can use that information to configure itself, such as quality of service optimization. This is particularly useful in a digital video recorder, where the metadata can be cached for quicker response and lower power consumption. The API can be used to change the data storage device configurations, and download firmware.

For diagnostic purposes a software monitor could be placed on a system that could inform the data storage device what processes or commands are currently in operation. In the event of a failure of the data storage device, any failure analysis would have as input those informed commands or processes.

Systems and software that are particularly sensitive to latencies induced by the data storage device performing background activities could inform the drive to delay those background activities during time-critical operations. In reverse, the data storage device could inform the system when it is preparing to, or in the middle of, a background activity. The system could re-adjust operations accordingly.

Further examples of information follow, some of which if received from the host would enable enhanced caching of a data storage device. One benefit derived from an SSHD is a quicker boot of the OS. The SSHD can pin all of the data associated with a boot and preserve it for future boots. The SSHD is capable of determining the beginning of the boot process by assuming it is immediately preceded by a power-on condition. However, a difficulty arises when discerning between the end of the boot process and the beginning of the first application loading. The host providing the end of boot information to the SSHD would minimize unnecessary use of the flash memory.

A data storage device implementing the systems described herein can provide a performance benefit to the end user by identifying accesses associated with user applications and then stores them in the cache memory for reduced latency. However, many background tasks, like virus scan, can create access patterns that the data storage device might otherwise inadvertently identify as user activity and trigger a caching of data. This type of false positive caching trigger can displace a lot of cache memory capacity while providing little future benefit to the end user. Though, the false positive cache trigger can provide performance gains to background activity that is generally invisible to an end user. However, the host OS can identify to the data storage device, via the direct hint partition, which accesses were being done by foreground activities (ones desirable to have in flash memory) versus background activities (ones that are not desirable to have in flash memory) it can improve the efficiency with which the cache memory is used.

In other examples, a host OS will load application files into host DRAM for execution. If the amount of file data associated with all of the opened applications exceeds the size of the DRAM, the host OS can employ a technique of file swapping. When a host is trying to load a new application and does not have sufficient room in the system DRAM it will take a portion of data already existing in the DRAM that has not been used recently and will store it to a specific area of the data storage device to make room in the DRAM. If a future user interaction once again requires the data that was moved to data storage device, the OS will "swap" some other portion of data in the DRAM for the previous data stored on the data storage device. This can continue as the user pattern varies. The swapping of data to and from the data storage device is a direct impact on performance for the user. Therefore, it is desirable for this operation to be accomplished quickly. If the data storage device were to be informed, via the direct hint partition, that data being written was a "swap" file then the data storage device would know that this data should be stored in cache memory. Then, when this "swap" file once again needs to be loaded to DRAM, the swap file will be retrieved from a faster cache memory due to the indicators stored at the direct hint partition, and may occur faster than if from a different storage medium of the data storage device.

Yet, in more examples, to improve the loading of frequently used applications after a power up, some OS prefetch files store the application in a format on the data storage device that is quick to recover. For maximum performance benefit it is beneficial for the retrieval of the prefetched file to come from the cache memory. If the OS provided an indication, via the direct hint partition, to the data storage device that a file being written was a file to be prefetched, then the data storage device would know to write this to the cache memory for faster future retrieval.

Further, for a data storage device installed in a notebook system, the policies used to determine the contents that should be placed in cache memory via the direct hint partition could change depending on if the system is plugged into an AC source or if it is running on battery power. When plugged in to AC the high priority parameter can be performance; in this case, the data storage device can utilize the cache memory for performance, but would leave the other memory in a state that would provide fast access if the needed data is there. However, if on battery, the choice might be to utilize the cache memory for power savings. In this mode, the data storage device would keep the other memory in a low power state as much as possible and would use the cache memory for caching read and write data being used such that little to no data is needed from the other memory.

A software application can determine whether the system is on AC or battery power, even the battery power level. For example, in Windows OS, the software application can use the System Event Notification Service with the ISensOnNow interface and the BatteryLow, OnACPower and OnBatteryPower methods. Thus, the software application will be notified if the system is using AC or battery power. Then, as described above, the software application can save this information in a file to the direct hint partition. A different format from that used in FIG. 3 can be used to relay the information. From there the data storage device software can read the file in the direct hint partition and configure itself based on whether the system is on AC or battery power.

Thus, a file can be an identifier of data. An external or separate software application or system can use the file to interact with data on a different device, such as delete, modify, move, save, read, etc. A file system of the OS can translate the file to associated LBAs of the data storage device. In this case, the OS and storage interface standard do not have to be modified.

The information in the direct hint partition can be read at power up of the data storage device, monitored during operation of the data storage device, or both. Furthermore, the information to be written to the direct hint partition can be determined during the processing of the write command to the direct hint partition. The direct hint partition can also be contained in any of the memories of the data storage device, such as memory 150 in FIG. 1.

Any of the above methods and apparatus can be reversed to provide a mechanism for the data storage device to communicate to the software application or host OS. For example, if a data storage device is used with self-pinning enabled, the device can save about the pinned LBA information to the direct hint partition. This information can then be read by the host to gain insight into access patterns. This information can be useful in moving data around in tiered storage system.

The above-described data storage device can be a hard disc drive, SSHD, optical or tape drive, storage subsystem like RAID, network-attached storage, storage area network, distributed file system, and the cloud. The data storage device can be a peripheral device or can be on the host motherboard. The operating system can be Linux, Unix, Windows, Apple, and Android based, and also variants.

In cases of a tiered storage system, the direct hint partition can be in any memory of any tier. The controller of a tiered storage system would then read a file saved in the partition and then configure the system accordingly. For instance, the controller could move data from a slower performing tier to a faster performing tier, from a slower accessible tier to a faster accessible tier, or from a less reliable tier to a more reliable tier.

In accordance with various embodiments, the functions and methods described herein may be implemented as one or more software programs running on a computer processor or controller device. In accordance with other embodiments, the functions and methods described herein may be implemented as one or more software programs running on a computing device, such as a personal computer that is using a data storage device such as a disc drive. Dedicated hardware implementations including, but not limited to, application specific integrated circuits, programmable logic arrays, and other hardware devices can likewise be constructed to implement the methods described herein. Further, the functions and methods described herein may be implemented as a computer readable storage medium or device, such as hardware components storing instructions that when executed cause a processor to perform the methods. Instructions for performing the functions and methods disclosed herein may also be broadcast to a device for execution using computer readable transmission media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a controller configured to:
receive a write command from a host including first data to be stored at a direct hint partition of a first memory, the direct hint partition including a logical block address (LBA) range reserved to store the first data sent from the host to influence one or more the operations of the apparatus;
the first data includes information regarding an operating status of the host, including identifying a process executing at the host;
store the first data to the direct hint partition;
read the first data from the direct hint partition to determine an operation to perform; and
perform the operation based on the first data.

2. The apparatus of claim 1 further comprising:
the first data includes configuration instructions to be performed by the controller;
the controller is further configured to:
read the configuration instructions stored to the direct hint partition to obtain direction from the host on how to configure the apparatus; and
perform the operation, including configure operational parameters of the apparatus based on the configuration instructions.

3. The apparatus of claim 1 further comprising:
the first data includes a set of logical block addresses (LBAs) indicating other data to be copied from the first memory to a second memory;
the controller is further configured to:
read the set of LBAs stored to the direct hint partition to determine the other data to copy; and
perform the operation, including copy the other data associated with the set of LBAs from the first memory to the second memory based on first data.

4. The apparatus of claim 3 further comprising the first memory is a nonvolatile memory and the second memory is a nonvolatile solid state cache memory.

5. The apparatus of claim 1 further comprising the first data includes instructions from the host to be executed at the apparatus.

6. The apparatus of claim 1 further comprising the first data includes a set of LBAs and information identifying a type of data stored to the set of LBAs.

7. The apparatus of claim 1 further comprising:
the first data includes firmware;
the controller configured to perform the operation, including:
read the firmware from the direct hint partition; and
install the firmware on the apparatus.

8. The apparatus of claim 1 further comprising:
the direct hint partition is further reserved to store apparatus information regarding operations of the apparatus to be communicated to the host; and
the controller further configured to provide the apparatus information from the direct hint partition to the host in response to a host read command directed to the direct hint partition.

9. An apparatus comprising:
a controller configured to:
receive a write command from a host including first data to be stored to a designated range of logical block addresses (LBAs) of a first memory, the designated range of LBAs reserved for communication between the host and the apparatus;
store the first data to the designated range of LBAs;
read the first data from the designated range of LBAs to determine an operation to perform;
perform the operation based on the first data;
store apparatus information to the designated range of LBAs, the apparatus information regarding activity of the apparatus to be communicated to the host; and
provide the apparatus information from the designated range of LBAs to the host in response to a host read command directed to the designated range of LBAs.

10. The apparatus of claim 9 further comprising:
the first data includes configuration instructions to be performed by the controller;
the controller is further configured to:
read the configuration instructions stored to the designated range of LBAs to obtain configuration information from the host; and
perform the operation, including setting background activity parameters of the apparatus based on the configuration instructions.

11. The apparatus of claim 9 further comprising:
the first data includes a set of LBAs corresponding to other data to be copied from the first memory to a second memory;
the controller is further configured to:
read the set of LBAs stored to the designated range of LBAs to determine the other data to copy; and
perform the operation, including copy the other data associated with the set of LBAs from the first memory to the second memory based on first data.

12. The apparatus of claim 9 further comprising:
the designated range of LBAs corresponds to a dedicated memory partition reserved for exchanging system information between the host and the apparatus via standard read and write commands directed to the dedicated memory partition.

13. An apparatus comprising:
a controller configured to:
maintain a designated area of a data storage medium, the designated area including a range of logical block addresses (LBAs) reserved for communicating system information between a host and the apparatus via read and write operations to the designated area, the designated area corresponds to a dedicated memory partition reserved for communicating system information between the host and the apparatus via standard read and write commands directed to the dedicated memory partition, independent of a storage interface standard used to transmit commands between the host and the apparatus;
receive a write command from the host including first data to be stored to the designated area;
store the first data to the designated area;
read the first data from the designated area to determine an operation to perform; and
perform the operation based on the first data.

14. The apparatus of claim 13 further comprising:
the first data includes a listing of LBAs corresponding to user data and instructions to load the user data into a nonvolatile cache memory;
the controller is further configured to:
read the listing of LBAs stored to the designated area to determine what data to cache; and perform the operation, including copy the user data associated with the listing of LBAs from a first memory to the nonvolatile cache memory based on the instructions.

15. The apparatus of claim 13 further comprising:
the first data includes configuration instructions to be performed by the controller;
the controller is further configured to:
   read the configuration instructions stored to the designated area by the host; and
   perform the operation, including configure operational parameters of the apparatus based on the configuration instructions.

16. The apparatus of claim 13 further comprising:
the designated area is reserved for two-way communication between the host and the apparatus;
the controller further configured to:
   store apparatus information to the designated area, the apparatus information regarding an operational status of the apparatus to be communicated to the host; and
   provide the apparatus information from the designated area to the host in response to a host read command directed to the designated area.

\* \* \* \* \*